(12) United States Patent
Makino

(10) Patent No.: US 6,319,559 B1
(45) Date of Patent: Nov. 20, 2001

(54) ADHESIVE APPLYING METHOD IN FORMING A SEAT

(75) Inventor: Hiroyuki Makino, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/570,132

(22) Filed: May 12, 2000

(51) Int. Cl.[7] .................................. B05D 1/34; B05D 5/10
(52) U.S. Cl. .................... 427/422; 427/421; 427/426; 427/207.1; 156/330.9; 156/331.7
(58) Field of Search .................................. 427/421, 422, 427/426, 207.1, 385.5; 156/330.9, 331.7, DIG. 20, DIG. 21, 297

(56) References Cited

U.S. PATENT DOCUMENTS

| | | | | |
|---|---|---|---|---|
| 4,298,656 | * | 11/1981 | Mendelsohn | 428/414 |
| 4,352,858 | * | 10/1982 | Stanley | 428/423.1 |
| 4,667,084 | * | 5/1987 | Regge | 219/301 |
| 5,478,014 | * | 12/1995 | Hynds | 239/135 |
| 5,643,385 | | 7/1997 | Kikuchi et al. | |

* cited by examiner

Primary Examiner—Shrive P. Beck
Assistant Examiner—Jennifer Calcagni
(74) Attorney, Agent, or Firm—Browdy and Neimark

(57) ABSTRACT

Method and system for applying an adhesive agent to a covering material in the process of bonding the covering material to a foam cushion member to produce a bonded unit forming a seat. As a base material of the adhesive agent, only a primary component material and secondary curing agent are used, without any organic solvent added in the primary component material. Heat of a predetermined temperature is continuously applied to the primary component material by heating elements so as to retain its lowered viscosity through a whole fluid passage from a storage point to a spray gun, so that the heated primary component material in a fluid state may be injected from the spray gun, while being mixed with the curing agent in the air at the same time, thereby applying a properly atomized state of the mixture, as an adhesive agent, to the covering material.

6 Claims, 2 Drawing Sheets

ADHESIVE APPLYING METHOD IN FORMING A SEAT

BACKGROUND OF INVENTION

1. Field of the Invention

The present invention relates to an method and system for adhering seat constituent materials together in forming an automotive seat. More particularly, the invention is directed to a method and system for applying an adhesive agent to a covering material in the process of bonding the covering material to a foam cushion member to create a bonded unit for forming an automotive seat.

2. Description of Prior Art

In forming an automotive seat, there has been known and employed an adhering method involving use of an adhesive agent, in which a covering material or trim cover assembly is adhesively bonded via an adhesive agent to the outer surfaces of a pre-molded foam cushion member or padding, so that a bonded unit obtained, having a predetermined configuration of a constituent part of an automotive seat, such as a seat cushion and seat back thereof.

Conventionally, an adhesive agent that has commonly been used in this field, comprises a primary component material containing an organic solvent therein and a curing agent, both of them being in a liquid state. A typical example of the primary component material used is an urethane prepolymer material with about 20% of organic solvent (e.g. methylene chloride) added thereto. In a hitherto operation, those two liquid materials are sprayed from the respective two injection nozzles of an atomizer or sprayer and mixed together in a mist state in the air. Such atomized mixture are forcibly impinged and applied evenly on the reverse surfaces of a covering material or on the outer surfaces of foam cushion member. This spraying operation has been conducted in a tightly closed room to improve a safety on the workers' part. The adhesive-applied covering material is then pressingly bonded to the foam cushion member by means of a bonding pressure die to produce a bonded unit.

Under those circumstances, the conventional adhering method in forming a seat has required adding an organic solvent (e.g. methylene chloride) to the primary component material in order to keep the adhesive agent in a proper liquid state, so that the liquid adhesive agent may be atomized well in the air and uniformly sprayed onto a cover material which is to be adhesively bonded over a cushion member.

SUMMARY OF THE INVENTION

In view of the above-stated drawbacks, it is a primary purpose of the present invention to provide an improved method which eliminates addition of any organic solvent to a primary component material of an adhesive agent in applying the adhesive agent to a covering material in the process of bonding the covering material to a foam cushion member to create a bonded unit forming a seat or seat portion.

To achieve such purpose, in accordance with the present invention, there is basically provided the steps of:

providing a primary component material and a secondary curing agent, both of them constituting a base material of an adhesive agent;

applying a heat to the primary component material; and atomizing and mixing together both primary component material and secondary curing agent in air in a direction to a covering material, so that the adhesive agent is uniformly applied to the covering material.

Accordingly, the use of heat is effective in lowering the viscosity of the primary component material, without use of any organic solvent, so that the primary component material may be properly atomized for mixing with the curing agent in the air, which in turns realizes a uniform applying of resulting adhesive agent to the covering material. Hence, a temperature of the heat is set to such a degree that lowers a viscosity of the primary component material used. Preferably, the primary component material is a urethane prepolymer material, in which case, about 80° C. temperature of heat is applied thereto so as to lower a viscosity thereof at an appropriate degree.

It is a secondary purpose of the present invention to provide a system for effecting the above-mentioned method.

For that purpose, the system, in accordance with the present invention, basically comprises:

an atomizing means including a first injection nozzle for atomizing or spraying said primary component material therefrom and a second injection nozzle for atomizing or spraying said secondary curing agent therefrom, the atomizing means being operable to atomize or spray both the primary component material and secondary curing agent and mix them together in the air in a direction toward a covering material;

a first storage means for storing the primary component material therein;

a second storage means for storing the secondary curing agent therein, the second storage means being in a fluid communication with the second injection nozzle;

an external fluid passage means provided for a fluid communication between the first storage means and the first injection nozzle, an internal fluid passage means defined within the atomizing means, which internal fluid passage means allows for a fluid communication between the first injection nozzle and the fluid passage means; and a heating means for continuously applying a heat to each of those first storage means, external fluid passage means and internal fluid passage means.

Any other specific advantages and features of the present invention will become apparent from reading of the descriptions hereinafter, with reference to the annexed drawings.

DETAILED DESCRIPTION OF PREFERRED EMBODIMENT OF THE INVENTION

Figure 1:
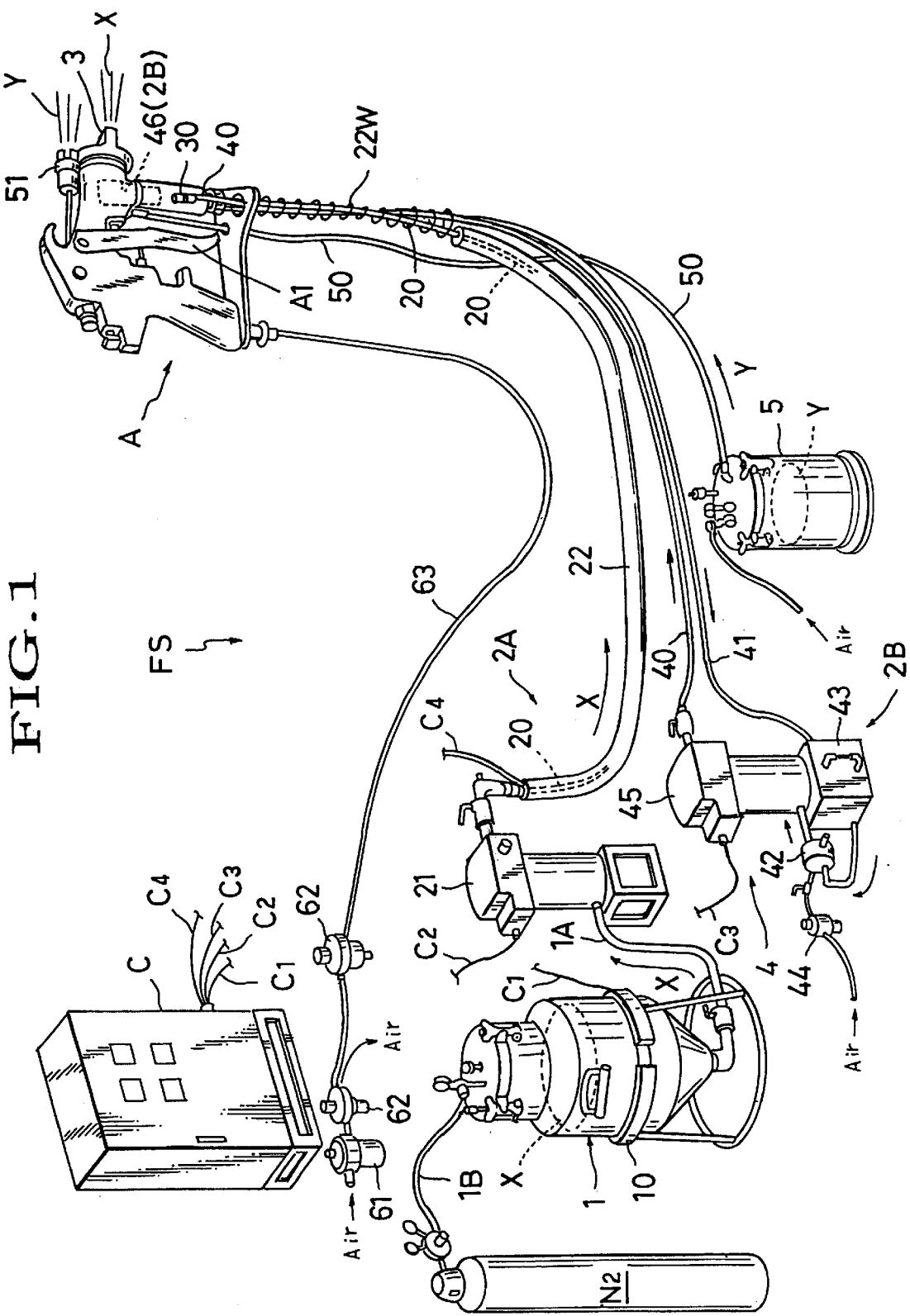
FIG. 1 is a schematic perspective view of a system in accordance with the present invention.
Figure 2:
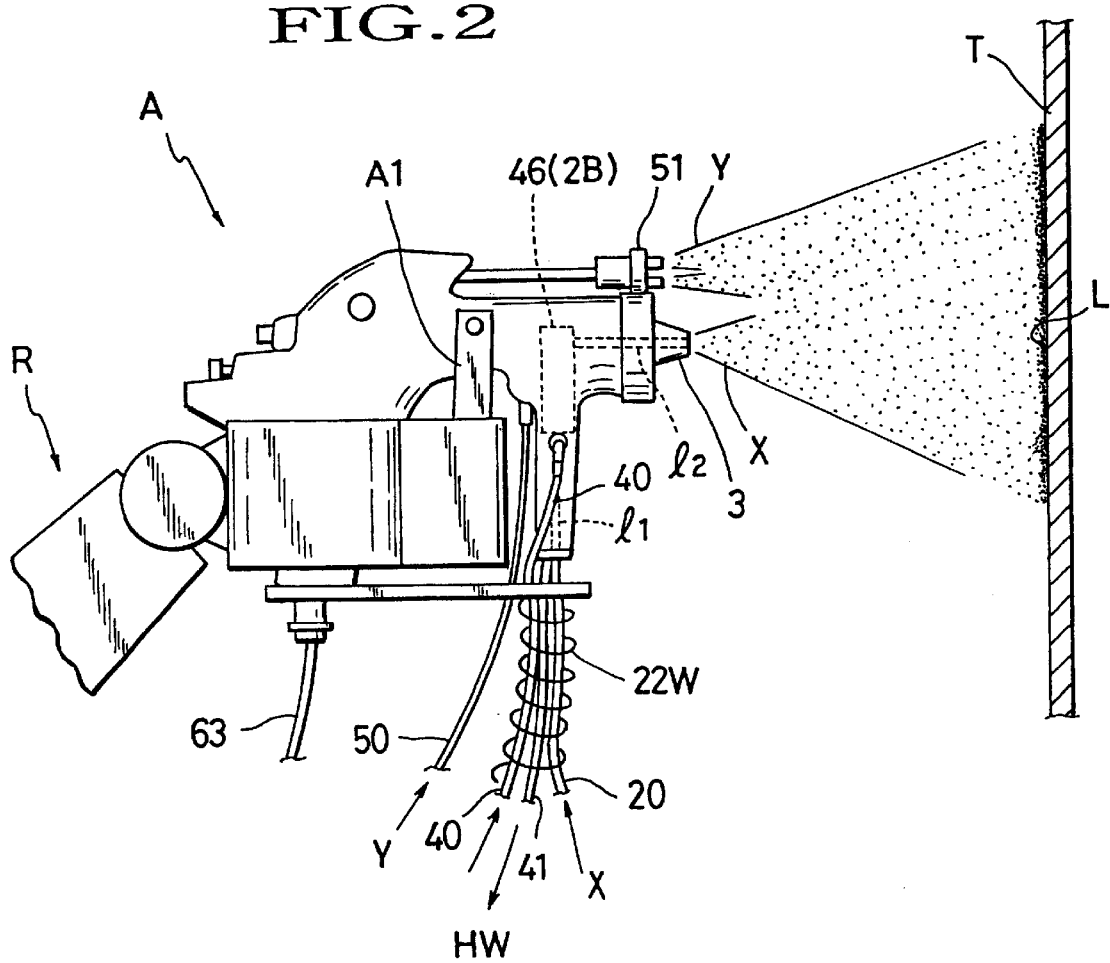
FIG. 2 is a partly broken schematic fragmentary view of a principal part of the present invention, showing the state where a spray gun is operated by a robot arm to spray a primary component agent and a curing agent, mixing them together, onto a covering material.
Figure 3:
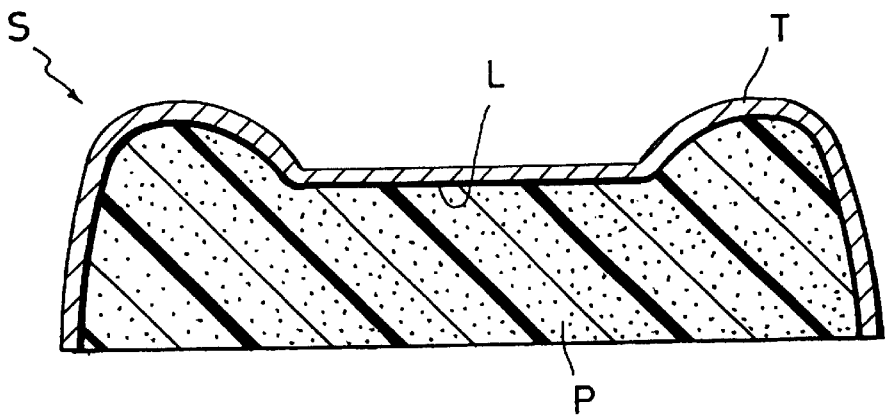
FIG. 3 is a sectional view of a bonded unit forming a seat, which is produced in accordance with the present invention.

Referring to FIGS. 1 to 3, there is illustrated one embodiment of method and system for adhering a cover material to a foam cushion member in the process of foaming an automotive seat in accordance with the present invention.

FIG. 1 shows a whole system generally designated by (FS), which, by way of one example, embodies a principal concept of the present invention for applying an adhesive agent (see the designation (L) in FIG. 2) to a covering material (the designation (T) in FIG. 2) without use of organic solvent. The inventor has found that continuing to give a predetermined temperature of heat to a particular primary component material of adhesive agent throughout a fluid passage is a key factor for retaining a proper liquid state of the adhesive agent with a properly lowered viscosity, which eliminates adding of any organic solvent thereto and also allows the adhesive agent to be smoothly and evenly sprayed in the air from an adhesive applicator or spray gun (A).

A gun-type atomizer or spray gun (A) is shown in FIGS. 1 and 2 as being of a known dual-spraying type having a first injection nozzle (3) from which a primary component material (X) of adhesive agent may be injected and a second injection nozzle (51) from which a secondary curing agent (Y) of adhesive agent be injected, so that, when injected and sprayed from their respective nozzles (3) and (51), both of them (X) (Y), naturally placed in an atomized state, will be mixed together in the air and may be applied to a surface of a covering material (T), a part of an automotive seat (as in FIG. 2). The spray gun (A) is connected via a tubing (63) to an air supply source (not shown, but as indicated by "Air"), such that the above-stated two base materials (X) (Y) may be forcibly injected by the air pressure out of their respective nozzles (3) (51). Designations (61) (62) denote a filter and a pair of regulators, respectively. In accordance with the present invention, however, the spray gun (A) has, provided therein, a heat exchanger (46) which forms a part of a second heat retaining means (2B), as will be described. The heat exchanger (46) works to keep the primary component material (X) heated at a predetermined fixed temperature within an internal flow passage of the spray gun (A) until that material (X) is injected outwardly at a desired temperature of about 75° C. from the corresponding nozzle (3). Such approx. 75° C. temperature is an optimum factor for allowing the primary component material (X) (urethane prepolymer material) to be smoothly sprayed and atomized in a proper misty state for mixing with the curing agent (Y) in the air. On the other hand, the secondary curing agent (Y) is an ordinary one widely used in the liquid form under a normal temperature or room temperature, thus requiring no heating thereto.

Referring again to FIG. 1, within the scopes encompassed by the present invention, the system (FS) includes: a first heating means (2A) for continuously applying a predetermined temperature of heat not only to the primary component material (X) stored in a storage tank, but also to a whole external fluid passage defined externally of the spray device (A), through which external fluid passage, the primary component material (X) flows; and a second heating means (2B) provided within the spray gun (A), which also continuously applies the same temperature of heat to an internal fluid passage provided inside the spray device (A), through which internal fluid passage, the material (X) passes towards the nozzle (3).

Needless to mention, the primary component material (X) of adhesive agent used in the present invention does not require adding any organic solvent thereto and therefore may be selected from a suitable one of urethane prepolymer materials. A preferred mode of the urethane prepolymer materials may be a urethane prepolymer of polyether system, which has an isocyanate end group contained therein. Practically, for instance, such preferred mode of urethane prepolymer may be prepared from approx. 90 wt % of ester phthalate and approx. 10 wt % of 4.4'-diphenylmethane diisocyanate. A suitable kind of curing agent (Y) for such urethane adhesive material is therefore used in the present invention.

As shown in FIG. 1, a storage tank (1) is provided for storing a liquid state of the above-stated primary component material (X) (a fluid state of urethan prepolymer) therein. In accordance with the present invention, a ringed shape of heater (10), a part of the first heating means (2A), is wound around the tank (1) so that the primary component material (X) in the tank is initially kept heated at a proper fixed temperature, thereby placing the same (X) in the state where it has a certain viscosity and fluidity. Preferably, the temperature in this respect is set at about 50° C. to maintain such urethan prepolymer material (X) in a proper fluid state. The heater (10) is electrically connected via a electric wire (C1) to a control unit (C) and so controlled thereby as to keep constant about 50° C. temperature of the agent (X) stored in the tank (1). The storage tank (1) is connected via a tubing (1B) to a nitrogen cylinder bottle ($N_2$) so that a pressure may be applied by nitrogen gas into the tank (1), thereby forcibly transferring the liquid primary component material (X) under the gas pressure through a tubing (1A) into a heater (21) which forms a part of the external heating means (2A). The nitrogen cylinder bottle ($N_2$) is not imitative, but any other pressure applying means (using air) may be used.

Designation (5) denotes a storage tank for storing the liquid secondary curing agent (Y) therein. This storage tank (5) is communicated with an air supply source (not shown, but as indicated by the character "Air"), so that the liquid curing agent (Y) may be forced by an air pressure given from the source (Air) out of the tank (5) and transferred via a tubing (50) into the spray device (A).

In accordance with the present invention, an external flow passage, through which the liquid primary component material (X) passes from the tank (1) to the spray device (A), is kept heated at a predetermined fixed temperature by the first heating means (2A). Specifically, as illustrated in FIG. 1, the first heating means (2A) may comprise: a heater (21) connected via tubing (1A) with the tank (1), the heater (21) being of the type controllable for heating the liquid primary component material (X) at a fixed temperature and maintaining a viscosity thereof constant; and a tubular heater (22) covering a flexible tubing (20) (made of a Teflon material) which forms a fluid passage of that material (X) to the spray gun (A). The flexible tubing (20) is shown as being connected between the heater (21) and spray gun (A), to thereby establish a fluid communication therebetween. The heater (21) used in this embodiment is what is known as a "viscous control heater", or a heater designed to heat a fluid passing therethrough (i.e. the fluid state of urethan prepolymer material (X)) at 80° C. temperature and so controlled as to retain an appropriate viscosity thereof. The tubular heater (22) may have, embedded therein, a coiled heating wire or a coiled hot-water circulation tubing, as indicated by (22W), to keep on applying a heat of 80° C. to the flexible tubing (20). However, the tubular heater (22) is not limitative, but any other suitable heating means may be utilized for that purpose.

The heater (21) and tubular heater (22), if the latter uses the coiled electric wire, may have their own electric wires (C2) and (C4) each being electrically connected to the control unit (C), respectively, and so controlled thereby as to keep applying 80° C. temperature of heat to the primary component material (X) flowing through those two heaters, and also keep the same material (X) warm at 80° C. throughout its external fluid passage (at 20).

Further, in accordance with the present invention, an internal fluid passage (1 1 and 1 2 in FIG. 2), through which the primary component agent (X) passes towards the nozzle (3) within the spray device (A), is also kept heated at 80° C.

by the second heat retaining means (2B). Specifically, as shown in FIGS. 1 and 2, the second heat retaining means (2B) may comprise: a built-in heat exchanger (46) installed in the spray gun (A); and a hot water circulation unit (4) arranged for a fluid communication with such heat exchanger (46). As understandable from FIG. 2, provided in the spray device (A) are downstream and upstream fluid passages (1 1) (1 2), each being in a fluid communication with the flexible tubing (20) and nozzle (3), respectively. The heat exchanger (46) is interposed between those two fluid passages (1 1) (1 2), as best indicated by the phantom lines in FIG. 2. Connected at their respective first ends to this heat exchanger (46) are a pair of hot water circulation tubings (40) (41), which are each in turn connected at its second end to a heater (45) and a water storage container (43), respectively. An air pump (42) is connected between such heater (45) and container (43) in a fluid communication therewith, whereupon those elements constitute a main body of the hot water circulation unit (4). The air pump (42) is further connected with an air supply source (not shown, but as indicated by "Air") and may be driven by an air pressure force introduced from the source to cause circulation of a hot water of 80° C., as indicated by the arrows in FIG. 1 and the designation (HW) in FIG. 2, through the associated fluid circulation passages (i.e. 40, 46, 41, 43, 42). The heater (45) is electrically connected by an electric wire (C3) to the control unit (C) and so controlled thereby as to keep applying 80° C. temperature of heat to a water being circulated, while keeping the water warm constantly at the same temperature.

Preferably, as in FIG. 1, the upstream portions of both flexible tubing (20) and two hot water circulation tubings (40, 41) may be embracingly held together by a spirally extending coated heating electric wire. This heating electric wire may be an exposed extension part of the previously stated coiled electric wire (22W) embedded in the tubular heater (22). With this arrangement, all those tubings (20, 40, 41) can be moved smoothly along with the movement of a robot arm (R) shown in FIG. 2, while being still heated by the wire (22W) at the 80° C. temperature simultaneously.

In operation, as shown in FIG. 2, the spray gun (A) is grasped and hold by a robot arm (R), which orients the gun towards a covering material (T). When the robot arm (R) draws the trigger (A1) of spray device (A), the primary component material (X) or a liquid state of urethane prepolymer adhesive material is injected from the first injection nozzle (3) at about 75° C., while at the same time, the secondary curing agent (Y) is injected from the second nozzle (51). Both two materials (X) (Y) are atomized and mixed uniformly together in the air, as shown, to provide a well atomized and mixed state of the two materials (X) (Y). At this moment, it is noted that the viscosity of primary component material (X) becomes an optimum degree of about 800 centipoise for such atomization and mixing with the curing agent (Y), so that a stable amount of the atomized mixture is impinged evenly onto the surface of the covering material (T). Consequently, a uniform layer of resulting adhesive agent is created on the surface of covering material (T). As shown in FIG. 3, such adhesive-applied surface of covering material (T) is pressed and firmly adhered, as by a suitable pressure bonding die means (not shown), onto the surfaces of a foam cushion member or padding (P), whereupon there is produced a bonded unit forming an automotive seat or a seat portion thereof, as designated by (S), including a seat cushion or seat back of automotive seat for instance for instance.

It should be noted that the temperature of heat to be applied to the first and second heating means (10, 21, 22, 45, 46) is not limited to the aforementioned values, i.e. 50° C. and 80° C., but will vary appropriately, depending upon the sort of the primary component material used, in order that the primary component material may have a proper viscosity and fluidity for an optimum injection and atomization by the spray gun (A).

It is appreciated that, in accordance with the present invention, a whole fluid passage of the primary component material (X) is kept heated at a fixed temperature, thereby maintaining its proper fluidity and viscosity throughout the passages from the storage tank (1) to the injection nozzle (3) of spray gun (A), which eliminates addition of any solvent to the primary component material (X) as found in the prior art and also avoids varied rates of flow of the material (X) in the whole fluid passages. Hence, the primary component material (X) can be atomized into an optimum misty state for mixing with the curing agent (Y) in the air, which allows for uniform spraying of resulting adhesive agent onto the surfaces of covering material or the like, without any densely sprayed point thereon.

While having described the present invention as above, it should be understood that the invention is not limited to the illustrated embodiment, but any other modifications, addition, and replacements may be methodologically and structurally applied thereto, without departing from the scopes of the appended claims.

What is claimed is:

1. A method for applying an adhesive agent to a covering material in a process of bonding the covering material to a foam cushion member to create a bonded unit forming a seat or a portion of seat, said method comprising the steps of:

providing a primary component material and a secondary curing agent, both of them constituting a base material of said adhesive agent;

providing an atomizing means for atomizing and spraying said primary component material towards said covering material, said atomizing means having a first fluid passage provided therewithin;

defining a second fluid passage through which said primary component material flows toward said atomizing means;

continuously applying a first predetermined temperature of heat to both of said first and second fluid passages, thereby applying said first predetermined heat to said primary component material; and atomizing and mixing together both said primary component material and secondary curing agent in air at a second predetermined temperature by said atomizing means in a direction to said covering material, so that the adhesive agent is uniformly applied to the covering material.

2. The method as defined in claim 1, wherein said primary component material is urethane prepolymer material, and wherein said first temperature of heat is 80° C. so that a viscosity of said urethane prepolymer material is lowered to a degree that allows said adhesive agent to be atomized and mixed with said secondary curing agent by said atomizing means at said second temperature and to be uniformly applied thereby to said covering material.

3. The method as defined in claim 2, wherein said second temperature is about 75° C.

4. A method for applying an adhesive agent to a covering material in a process of bonding the covering material to a foam cushion member to create a bonded unit forming a seat or a portion of seat, said method comprising the steps of:

providing a primary component material and a secondary curing agent, both of them constituting a base material of said adhesive agent;

providing a storage means for storing said primary component material therein;

providing an atomizing means having an internal fluid passage therewithin and an injection nozzle for atomizing and spraying said primary component material towards said covering material;

defining an external fluid passage between said atomizing means and said storage means, through which external fluid passage, said primary component material flows toward said atomizing means;

continuously applying a first predetermined temperature of heat to both of said internal and external fluid passages, thereby applying said first predetermined heat to said primary component material; and atomizing and mixing together both said primary component material and secondary curing agent in air at a second predetermined temperature by said atomizing means in a direction to said covering material, so that the adhesive agent is uniformly applied to the covering material.

5. The method as defined in claim 4, wherein a first heating means is provided to apply said first predetermined temperature of heat to said external fluid passage, and wherein a second heating means is provided to apply a heat of same temperature as said first predetermined temperature to said internal fluid passage, whereby said primary component material is kept heated at said first predetermined temperature through all said external and internal fluid passages until the primary component material is atomized in the air from said atomizing means at said second predetermined temperature.

6. The method as defined in claim 5, wherein said primary component material is urethane prepolymer material, wherein said first predetermined temperature is about 80° C., wherein said second predetermined temperature is about 75° C., and wherein, while about 50° C. temperature of heat is kept applied to said urethane prepolymer material in said storage means, said about 80° C. first temperature is kept applied to the primary component material flowing through said external and internal fluid passages, so that the urethane prepolymer material is transferred, with a lowered viscosity, through the external and internal fluid passages to said atomizing means and injected therefrom at said about 75° C. second temperature.

* * * * *